(12) United States Patent
Von Schoultz

(10) Patent No.: US 10,407,452 B2
(45) Date of Patent: Sep. 10, 2019

(54) METHOD FOR EXTRACTING LIGNIN

(71) Applicant: Ab BLN-Woods Ltd, Parainen (FI)

(72) Inventor: Sebastian Von Schoultz, Espoo (FI)

(73) Assignee: CH-Bioforce Oy, Espoo (FI)

( * ) Notice: Subject to any disclaimer, the term of this patent is extended or adjusted under 35 U.S.C. 154(b) by 0 days.

(21) Appl. No.: 15/109,669

(22) PCT Filed: Jan. 9, 2015

(86) PCT No.: PCT/FI2015/050011
§ 371 (c)(1),
(2) Date: Jul. 5, 2016

(87) PCT Pub. No.: WO2015/104460
PCT Pub. Date: Jul. 16, 2015

(65) Prior Publication Data
US 2016/0326203 A1 Nov. 10, 2016

(30) Foreign Application Priority Data

Jan. 10, 2014 (FI) ..................................... 20145018

(51) Int. Cl.
| | | |
|---|---|---|
| *C07G 1/00* | (2011.01) | |
| *C10L 5/44* | (2006.01) | |
| *D21C 3/04* | (2006.01) | |
| *C10L 5/36* | (2006.01) | |
| *C08B 1/00* | (2006.01) | |
| *D21C 3/02* | (2006.01) | |
| *D21C 1/10* | (2006.01) | |
| *D21C 3/22* | (2006.01) | |

(52) U.S. Cl.
CPC .................. *C07G 1/00* (2013.01); *C08B 1/00* (2013.01); *C10L 5/363* (2013.01); *C10L 5/442* (2013.01); *D21C 1/10* (2013.01); *D21C 3/02* (2013.01); *D21C 3/04* (2013.01); *D21C 3/22* (2013.01); *C10L 2200/0469* (2013.01); *C10L 2290/06* (2013.01); *C10L 2290/30* (2013.01); *C10L 2290/544* (2013.01); *Y02E 50/10* (2013.01); *Y02E 50/30* (2013.01)

(58) Field of Classification Search
CPC combination set(s) only.
See application file for complete search history.

(56) References Cited

U.S. PATENT DOCUMENTS

| | | | |
|---|---|---|---|
| 5,207,870 A | 5/1993 | Aho et al. | |
| 2009/0098617 A1 | 4/2009 | Burke et al. | |
| 2010/0269990 A1* | 10/2010 | Dottori ..................... | C08H 8/00 162/21 |
| 2012/0125551 A1* | 5/2012 | Cohen ...................... | D21C 1/06 162/70 |
| 2013/0202905 A1 | 8/2013 | Blount | |
| 2015/0152598 A1* | 6/2015 | Mitchell .................. | C08H 6/00 162/56 |
| 2016/0237459 A1* | 8/2016 | Brotherson ............... | C12P 7/06 |

FOREIGN PATENT DOCUMENTS

| | | | |
|---|---|---|---|
| CN | 101160388 A | 4/2008 | |
| CN | 101449001 A | 6/2009 | |
| CN | 101449001 A | 6/2009 | |
| CN | 103097437 A | 5/2013 | |
| CN | 103097437 A | 5/2013 | |
| CN | 103122594 A | 5/2013 | |
| GB | 806554 A | 12/1958 | |
| WO | WO2006110902 | * 10/2006 | |
| WO | WO-2006110902 A1 | * 10/2006 | ............... C12P 7/08 |
| WO | WO 2007111605 A1 | 10/2007 | |
| WO | WO2011154967 A1 | 12/2011 | |
| WO | WO2013092881 A2 | 6/2013 | |
| WO | WO2013124461 A2 | 8/2013 | |

* cited by examiner

*Primary Examiner* — Ellen M McAvoy
*Assistant Examiner* — Chantel L Graham
(74) *Attorney, Agent, or Firm* — Seppo Laine Oy

(57) ABSTRACT

The invention relates to a method for removing lignin from lignocellulosic biomass. The method comprises feeding of lignocellulosic biomass and a first aqueous solution into a reactor vessel, the lignocellulosic biomass and the first aqueous solution forming a reaction mixture; reducing the pressure in the reactor vessel below 0.8 bar absolute pressure, preferably 0.5 bar absolute pressure, more preferably below 0.2 bar absolute pressure; keeping the reaction mixture in a predetermined extraction temperature, and adding at least one extraction chemical, such as base or acid, to the reaction vessel and extracting lignin from the biomass to the liquid phase of the reaction mixture.

19 Claims, 1 Drawing Sheet

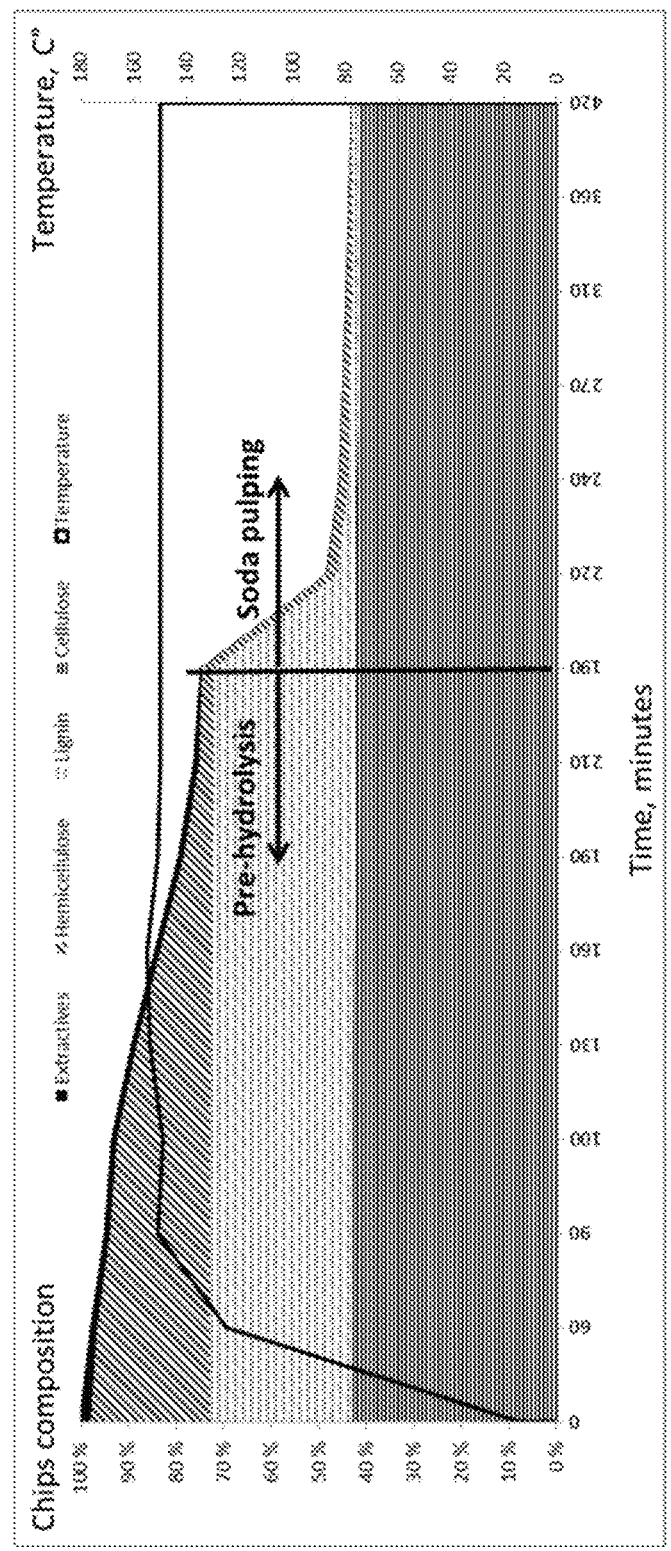

METHOD FOR EXTRACTING LIGNIN

The present invention relates to a method for extracting lignin from lignocellulosic biomass according to the preamble of the enclosed independent claim.

DESCRIPTION OF RELATED ART

Extraction of lignin from biomass can be done in many different ways. The most common methods are the sulfate and sulfite pulping processes, both these processes producing lignin which contains sulfur. Sulfur is undesirable for example if the lignin is intended to be used as fuel, because in such cases either the lignin or the flue-gases from the fuel combustion has to go through expensive desulfurization. There are processes which produce lignin, which is free of sulfur, such as the soda pulping process and various organosolv pulping processes, which use various solvents such as acetone, methanol, ethanol, butanol, ethylene glycol, formic acid and/or acetic acid.

In traditional alkaline pulping processes, lignin undergoes a variety of so called condensation reactions which increase the molar mass of lignin, and therefore makes the extraction of lignin from biomass more difficult. For example, lignin undergoes alkaline reactions which produce formaldehyde during the formation of vinyl ether via the relatively slow β-O-4 reactions. However, formaldehyde plays a major role in the condensation of lignin. Condensation reactions also decrease the reactivity of lignin, especially through reactions of the reactive groups in the aromatic structure. It is also well known that lignin condensation is extensive under oxygen delignification.

Alkaline conditions, which are used in the sulfate and soda pulping processes, are responsible for the alkaline degradation reactions of carbohydrates, such as the peeling reactions, which start already under 100° C. These reactions cause considerable and costly carbohydrate losses by lowering the pulping yield. Additionally these degradation reactions are responsible for the formation of acids in the process. These acids consume a major part of the valuable alkali during the pulping process even before any considerable dissolution of lignin has been obtained. Several additives, such as antraquinone, polysulfides and sodium borohydride have been investigated as a solution; however, the yield savings seldom covers the chemical costs.

In acidic sulfite pulping lignin extraction is determined by the degree of sulfonation of lignin, which makes lignin more hydrophilic and water soluble. The lignin extraction efficiency is counteracted by the condensation reactions of lignin. Acidic sulfite pulping is detrimental to the yield of cellulose and hemicelluloses due to acidic hydrolysis of carbohydrates into monosaccharides. Monosaccharides can react with bisulfate forming aldonic acids and thiosulfate which causes extensive lignin condensation. Acidic sulfite pulping is also prone for other lignin condensation reactions which are detrimental for lignin extraction.

In traditional pulping most of the pulping chemicals are added already in the beginning of the pulping process. Therefore, the unwanted degradation and condensation reactions cannot be avoided considering the time and temperature profiles, e.g. duration of 1-3 h, at 70-170° C. for Kraft process. The longer the pulping time, the more condensation and degradation reactions can occur.

There have been attempts to reduce the amount of air in the pulping of biomass by steaming. Biomass is brought into contact with hot steam which consequently heats the biomass and at the same time drives off the excess air from the reactor vessel. However, the biomass is heated up and often above 100° C. before the air, i.e. oxygen, is removed from the biomass. The elevated temperature induces the unwanted condensation and degradation reactions before than the oxygen level is reduced to adequate level.

SHORT SUMMARY OF THE INVENTION

It is the aim of this invention to reduce or even overcome the problems related to known art.

An aim of the present invention is to provide an improved method for extracting lignin from biomass.

In particular, another aim of the invention is to provide a method which effectively minimizes unwanted lignin condensation, and optionally also minimizes the carbohydrate hydrolysis and peeling reactions of the biomass.

Typical method according to the present invention for removing lignin from lignocellulosic biomass, comprises
feeding lignocellulosic biomass and a first aqueous solution into a reactor vessel, the lignocellulosic biomass and the first aqueous solution forming a reaction mixture,
reducing the pressure in the reactor vessel below 0.8 bar absolute pressure, preferably below 0.5 bar absolute pressure, more preferably below 0.2 bar absolute pressure,
keeping the reaction mixture in a predetermined extraction temperature, and
adding at least one extraction chemical to the reaction vessel and extracting lignin from the biomass to the liquid phase of the reaction mixture.

BRIEF DESCRIPTION OF THE DRAWINGS

FIG. 1 illustrates the composition of hemicellulose, lignin, and cellulose as a percentage of original chip dry wood during a pre-hydrolysis and delignification process in accordance with an aspect of the present invention.

DETAILED DESCRIPTION OF THE INVENTION

The present invention is based on the finding that reduced pressure provides oxygen starved environment and minimizes the unwanted condensation reactions of lignin. When the oxygen staved environment is already present at temperatures below the boiling point of water, the unwanted condensation reactions are surprisingly and unexpectedly reduced when the biomass is successively heated to and above the extraction temperature. After pressure reduction the reaction mixture, which comprises biomass and a first aqueous solution, is kept in an environment in which the solubility of lignin is minimal and unwanted reactions, such as oxidative condensation reactions of lignin, in the reaction mixture are minimized. The present invention overcomes at least some of the problems in known art with regard to lignin condensation during pre-hydrolysis and delignification through the use of reduced pressure and oxygen starved environment. Decrease in lignin condensation reactions increases both the quantity and quality of the extracted lignin.

Optionally, the present innovation further overcomes the problems in known art with regard to carbohydrate hydrolysis and peeling reactions by minimizing the time the cellulose rich fiber fraction is in contact with the lignin extraction liquor. The present innovation hence enables the separation of up to 99% of the lignin from the cellulose containing fiber fraction with equal or better cellulose yield compared to known art and with comparable sheet strength. Optionally also a separation up to 99% of the carbohydrates, such as hemicelluloses, is obtained.

In this context the term "lignocellulosic biomass" is understood as plant material, which comprises cellulosic fibers, carbohydrates such as hemicelluloses, and lignin. Examples of suitable lignocellulosic biomass are given later in this application.

In this context the term "absolute pressure" is understood as the pressure above absolute vacuum.

According to one embodiment of the invention the reaction mixture is kept at or heated to the predetermined extraction temperature. The predetermined extraction temperature may be in the range of 70-250° C. or in the range of 110-250° C., preferably 120-200° C., more preferably 135-160° C., even more preferably 140-150° C. According to one embodiment the extraction temperature does not exceed 250° C., preferably the extraction temperature does not exceed 150° C.

It is possible to add to the reaction vessel the biomass and the first aqueous solution, reduce the pressure and then heat the obtained reaction mixture to the desired extraction temperature. Alternatively, the biomass may be added to the reaction vessel first, the pressure may be reduced and a pressurized first aqueous solution having a temperature of 70-150° C., preferably 90-140° C., may be fed to the reactor vessel. In other words, in the present process it is either possible that
1) the biomass is fed to the reaction vessel, the pressure in the reactor vessel is reduced to the desired level and the first aqueous solution is fed to the reactor vessel while the pressure is kept reduced; or
2) the biomass and the first aqueous solution are fed to the reactor vessel successively or simultaneously, whereby a reaction mixture is obtained, whereafter the pressure in the reactor vessel is reduced.

In any case a reaction mixture comprising biomass and a first aqueous solution under reduced pressure below 0.8 bar in the reactor vessel is obtained.

The first aqueous solution may comprise at least 10 weight-% of water, preferably at least 75 weight-% of water, more preferably at least 85 weight-% of water, even more preferably at least 95 weight-% water. The first aqueous solution may comprise an organosolv, such as acetic acid, acetone, ethanol or any mixture thereof. According to one preferable embodiment the first aqueous solution is solely water, before the addition of the at least one extraction chemical.

The extraction chemical may be or comprise a base or an acid and it is preferably in form of a solution. Sodium hydroxide, potassium hydroxide magnesium hydroxide, sodium sulfide or any mixture thereof is suitable for use as the extraction chemical. Alternatively, formic acid, acetic acid, hydrochloric acid, sulfuric acid and their mixtures are suitable for use as the extraction chemical. The extraction chemical may also be a chemical or mixture of chemicals that are capable of dissolving lignin, especially the extraction chemical may be a chemical or mixture of chemicals that are used in conventional sulfite and sulfate pulping processes.

The extraction chemical may be used, for example, in following doses: 17-27 weight-% of NaOH; 17-27 weight-% of KOH; 25-37 weight-% of $Na_2S$; 40-60 weight-% of organosolv, such as acetone or ethanol; or 80-90 weight-% of acid, such as formic or acetic acid. The percentages are calculated from the weight of oven dry biomass. As seen, the dose of the extraction chemical depends on which extraction chemical is used. A person skilled in the art is able to find the optimum dose without extensive experimentation. Sodium hydroxide is a preferable extraction chemical.

According to one embodiment of the invention the extraction chemical comprises a base and the pH during the extraction of lignin is >10, preferably >12, more preferably >13. It has been observed that when the reaction mixture is subjected to aqueous solution in which lignin is soluble, such as water having a pH above 13, it is possible that more than 90% of the lignin in the biomass will be released to the solution from the biomass fiber fraction. The pH may be adjusted by using any suitable chemicals, such as strong bases or the like. For example, sodium hydroxide (NaOH) may be used.

The at least one extraction chemical is added to the reactor vessel when the extraction temperature is reached. The extraction chemical may be added as one single dose or as a plurality of successive doses. Preferably the extraction chemical is added as one single dose, as a "shot".

Lignin is extracted from the biomass to the liquid phase of the reaction mixture, the liquid phase comprising the first aqueous solution and the at least one extraction chemical. During the extraction lignin is enriched to liquid phase, which may be continuously circulated through the biomass. The lignin extraction may be continued by circulating the liquid phase of the reaction mixture through the biomass as long as the desired reduced lignin content of the biomass is reached. According to one embodiment of the invention the lignin rich extract from a previous extraction is used as an extraction chemical for the extraction of the biomass. Lignin in the lignin rich extract from the previous extraction may itself function as an extraction chemical for lignin still bound to the biomass. At the same time the consistency of the lignin rich extract is increased, which makes possible evaporation costs smaller.

According to one embodiment of the invention the biomass is selected from biomass comprising wood-based materials and/or from non-wood materials, such as bamboo, bagasse, hemp, wheat or rice straw. Suitable wood based materials are for example chips from trees in genus *Pinus*, such as pine (*Pinus sylvestris*), in genus *Betula*, such as birch (*Betula pendula*) or in genus *Picea*, such as spruce (*Picea abies*).

The biomass particle size or chip size is not an essential parameter. Preferable particles or chips have a thickness below 10 millimeters. Enhanced efficiency and/or speed of the lignin extraction can be thus achieved without significant yield losses. It is possible to crush or comminute the biomass particles or chips by using any suitable equipment, such as hammer mill, pin mill or the like, where the fiber length and integrity is not significantly affected.

The amount of oxygen in the reactor vessel is reduced when the pressure inside the reactor vessel is reduced before the start of the extraction of lignin. The temperature of the biomass is 0-90° C., more typically 15-70° C., when the pressure in the reactor vessel is reduced. Preferably, the oxygen gas level is kept at a minimum throughout the extraction of lignin. This means that the reactor vessel is closed and leakage or access of air into the reactor vessel is avoided, eliminated or minimized. Additional chemical oxygen scavengers, as described below, may be used to further decrease the amount of oxygen in the reactor vessel.

During the extraction of lignin the temperature of the reaction mixture is kept at the elevated level as described above and the environment in the reaction vessel is kept pressurized, i.e. the environment in the reactor vessel is starved from oxygen. The pressure inside the reactor vessel during the extraction of lignin may be 5-8 bar absolute pressure, more typically 6-7 bar absolute pressure.

The environment in the reactor vessel is starved from oxygen. This means that the amount of oxygen in the reactor vessel is preferably under 0.01 kg oxygen/kg aqueous solution in the vessel, more preferably under 0.005 kg oxygen/kg aqueous solution in the vessel, even more preferably under 0.0001 kg oxygen/kg aqueous solution in the vessel.

According to one embodiment of the invention carbohydrates, such as hemicelluloses, and possibly also other carbohydrates, may be separated from the biomass before the extraction of lignin by using a procedure commonly known as pre-hydrolysis. The separation of hemicellulose and the other carbohydrates is performed under reduced pressure before the extraction chemical is added to the reaction vessel. In this case the carbohydrates, such as hemicelluloses, are removed from the biomass before lignin extraction. This makes it possible to produce a lignin extract with high purity, the dry solids of the extract comprising 70-99 weight-% of lignin. It has been observed that also the unwanted peeling and hydrolysis reactions of carbohydrates are minimized when reduced pressure is employed. Carbohydrates are preferably separated from the biomass, prior to the extraction of lignin, by extracting the reaction mixture with a second aqueous solution. The pH of the second aqueous solution may be 3-10, preferably 4-9, more preferably 4-5, even more preferably 4.5-5. It has been observed over 85% of polysaccharides, such as hemicelluloses, may become dissolved to the second aqueous solution. Temperature during the separation of the carbohydrates may be in the range of 140-160° C., preferably between 145° C. and 155° C. The extraction of lignin to the second aqueous solution during separation of the carbohydrates is preferably minimized by keeping the temperature <155° C.

According to one preferable embodiment of the present invention the second aqueous solution, which comprises carbohydrates separated from the biomass is discharged from the reaction vessel when the desired separation level of carbohydrates is obtained. The second aqueous solution may be separated from the biomass by using any suitable method and/or apparatus, e.g. by washing, filtering, pressing, centrifuging. The dry solids of the obtained discharged second aqueous solution comprise typically less than 2 weight-% of lignin. After the second aqueous solution is separated from the biomass and discharged from the reactor vessel, the biomass with reduced carbohydrate content is brought into contact with the first aqueous solution in the reactor vessel, the pressure is optionally reduced if needed, and the temperature is brought into the extraction temperature and the at least on extraction chemical is added. In this manner a lignin extract with high purity is obtained.

According to an alternative embodiment the second aqueous solution is discharged from the reactor vessel and the extraction chemical is added, e.g. sprayed onto the biomass without a further addition of a first aqueous solution. In this case the second aqueous solution functions also as the first aqueous solution.

The second aqueous solution comprises normally at least 75% of water, preferably at least 85% of water, more preferably at least 95% water. The second aqueous solution may comprise an organosolv, such as acetic acid, acetone, ethanol or any mixture thereof, or a chelating agent. The second aqueous solution may comprise also pH adjusting chemicals, such as bases, acids or the like. For example, sodium hydroxide (NaOH) may be used. pH of the second aqueous solution is, for example 4.0-6.0, preferably 4.5-5.0, more preferably 4.6-4.7. According to one preferred embodiment the second aqueous solution comprises solely water.

According to one embodiment of the invention the removal of oxygen from the biomass can be increased by the addition of at least one chemical oxygen scavenger, such as ascorbic acid or any other suitable oxygen scavenger that is compatible with the process chemicals and conditions. The chemical oxygen scavenger(s) may be added in solution form to the first aqueous solution and/or to the second aqueous solution or they may be dissolved into the first aqueous solution and/or to the second aqueous solution. Alternatively chemical oxygen scavengers may be used in solid form, which is insoluble in the process. In case both the first and the second aqueous solution comprise an oxygen scavenger either solution form or solid form, the oxygen scavengers may be same or different from each other.

In case the separation of carbohydrates is performed before the extraction of lignin, the second aqueous solution is collected and displaced with the first aqueous solution before extraction of the lignin from the biomass.

The lignin rich extract is separated from the biomass and discharged from the reactor vessel. According to one embodiment the extracted lignin, after the separation from the biomass, is used for production of energy or fuel and/or as raw material for chemical products, such as carbon fibers, phenols or biocomposites.

The biomass, which comprises fibers, is recovered from the reaction vessel after the separation of the lignin rich extract. According to one embodiment the biomass, the after the extraction of lignin, is used for production of paper, board, or the like; for production of dissolving pulp or nanocellulose; for production pellets or as raw material for fuel; and/or for production of particle board (chipboard).

According to one embodiment of the present invention the method may comprise at least the following steps:
  biomass is fed into an reactor vessel, such as digester,
  the pressure of the reactor vessel is reduced to below 0.5 bar absolute pressure, preferably below 0.2 bar absolute pressure,
  a second aqueous solution is fed to the reactor, in which second aqueous solution lignin is not soluble and the solution having a pH value between 4 and 9, preferably between 4.5 and 5,
  circulation of the second aqueous solution is started through the biomass,
  temperature in the reactor vessel is increased,
  optionally the second aqueous solution rich in carbohydrates, such as hemicelluloses, is removed and replaced with clean solution when the consistency of the second aqueous solution does not increase, i.e. stays stable or decreases, or when a desired consistency is reached,
  a first aqueous solution is fed to the reactor vessel,
  temperature in the reactor vessel is adjusted,
  at least one extraction chemical is added,
  the liquid phase is circulated until the desired kappa (lignin content) of the biomass is reached,
  lignin rich extract is removed with a clean solution, such as water.

The method according to the present invention may be performed as a batch process or as a continuous process.

One advantage of the present invention is the possibility to shorten the time which is needed for extraction of lignin from the biomass. Typical extraction time is 10-120 min, preferably 15-90 min, more preferably 15-60 min, sometimes even 15-30 min.

EXPERIMENTAL

Some embodiments of the invention are described in the following non-limiting examples.

Example 1

The aim of Example 1 is to demonstrate the effect of reduced pressure on lignin extraction from birch chips.

The reactor arrangement comprises a 7 l pressure vessel, circulation pump, oil heater and a vacuum pump.

Three experiments were made, each using 978 g o.d. birch chips. The total amount of water inside the reactor was 7110 mL and the alkali (NaOH) charge was 30 g/L. We measured the total amount of material released, residual lignin in the chips according to TAPPI T 222 om-02 and the residual alkali according to SCAN-N 33:94.

Experiment 1: adding the alkali to the reactor, heating the reactor from 25° C. to 150° C. at a rate of 1.5° C./min, kept at 150° C. for 120 min.

Experiment 2: reducing the pressure inside the reactor to a 0.2 bar absolute pressure, adding the alkali to the reactor, releasing the pressure so that the reactor was at atmospheric pressure, heating the reactor from 25° C. to 150° C. at a rate of 1.5° C./min, kept at 150° C. for 120 min.

Experiment 3: reducing the pressure inside the reactor to a 0.2 bar absolute pressure, whereby an oxygen starved environment was obtained, adding the alkali to the reactor, starting the heating with an 0.2 bar absolute pressure, heating the reactor from 25° C. to 150° C. at a rate of 1.5° C./min, kept at 150° C. for 120 min. Oxygen starved environment was maintained throughout the experiment.

The percentage of biomass released into the cooking liquor was 56%, 54% and 48% for Experiments 1, 2 and 3 respectively. The residual lignin content of chips was 17%, 14% and 5% for experiment 1, 2 and 3 respectively. The residual alkali (NaOH, g/l) was 13.9, 15.0 and 18.3 for Experiments 1, 2 and 3, respectively. After washing and screening the total yield was 40%, 42% and 48% for Experiments 1, 2 and 3 respectively.

According to the results, a reduced pressure (experiment 2 compared to experiment 1) gives a little better delignification. However, when the lignin extraction was performed in reduced pressure, i.e. oxygen starved environment, the delignification was superior with the lowest alkali consumption in these Experiments. The maximum delignification was achieved after 90 minutes of extraction in all experiments. Additional 30 minutes of extraction time did not change the extract consistency in Experiment 3 with oxygen starved environment. However, in Experiments 1 and 2 the carbohydrate concentration of the extract continued to increase, indicating of carbohydrate peeling reactions.

Example 2

The aim of Example 2 was to investigate the effect of pre-hydrolysis on soda pulp quality.

The same reactor arrangement was used as in Example 1. Determination of hemicelluloses and pectins in wood and pulp fibers was done through acid methanolysis and gas chromatography, as described in Nord Pulp Pap Res J11(4): 216-219.

Two experiments were performed by using 970 g o.d. birch chips in both experiment 1 and 2. During delignification the alkali (NaOH) charge was 30 g/L.

Experiment 1: With atmospheric oxygen present, the reactor was filled with plain tap water, heating the reactor from 25° C. to 150° C. at a rate of 1.5° C./min, kept at 150° C. for 90 min, the pre-hydrolysis solution was displaced by tap water, 220 g of NaOH was pumped into the reactor (as a 10% w/w solution), extraction solution was circulated for 90 minutes, the lignin rich liquor is discharged.

Experiment 2: the pressure inside the reactor was reduced to a 0.2 bar absolute pressure, the reactor was filled with plain tap water, heating the reactor from 25° C. to 150° C. at a rate of 1.5° C./min, kept at 150° C. for 90 min, the pre-hydrolysis solution was displaced by tap water, 220 g of NaOH was pumped into the reactor (as a 10% w/w solution), extraction solution was circulated for 90 minutes, the lignin rich liquor was discharged.

For Experiments 1 and 2 the pre-hydrolysis solutions contained 13% and 19% of the total dry solids of the birch chips, respectively, and the hemicellulose content of the solutions was 90% and 96%, respectively. The results clearly demonstrate that a reduced pressure, i.e. an oxygen starved environment, enables a much better hemicellulose extraction and produces a higher purity extract than if atmospheric oxygen is present. The composition of birch chips in Experiment 2 is shown in FIG. 1 as a function of time. The amount of hemicellulose, lignin and cellulose in the chips is measured as a percentage of original chip dry wood.

For Experiments 1 and 2 the alkaline extraction solution contained 39% and 36% of the total dry solids of the original birch chips, respectively, and the hemicellulose content of the liquors were 28% and 14%, respectively.

For Experiments 1 and 2, the residual lignin content was 10% and 2.5%, respectively, and the hemicellulose content of the final chips from Experiment 2 was 0.14%.

The pulp from Experiment 2 was refined and compared to commercial fully bleached birch Kraft pulp refined to same degree. The tear index for the pulp from Experiment 2 and the reference pulp was 7.1 and 5.7 $Nm^2/kg$, respectively, and the tensile strength was 62 and 64 kNm/kg, respectively. The results clearly show that the pulp from Experiment 2 gives comparable or better sheet strength compared to the commercial reference pulp even though the hemicellulose content is below 0.2% whereas the reference pulp contains 17% of hemicellulose.

Example 3

The aim of Example 3 was to investigate the effect of pre-hydrolysis on soda pulp quality.

The same reactor arrangement was used as in Example 1. Determination of hemicelluloses and pectins in wood and pulp fibers was done through acid methanolysis and gas chromatography, as described in Nord Pulp Pap Res J11(4): 216-219.

Example 3 was performed by using on 970 g o.d. pine chips in the experiment. During delignification the alkali (NaOH) charge was 50 g/L:

Example 3: pressure inside the reactor was reduced to a 0.2 bar absolute pressure, the reactor was filled with plain tap water, heating the reactor from 25° C. to 150° C. at a rate of 1.5° C./min, kept at 150° C. for 90 min, the pre-hydrolysis solution was displaced by tap water, 400 g of NaOH was pumped into the reactor (as a 10% w/w solution), extraction solution was circulated for 90 minutes, the lignin rich extract was discharged.

In Example 3, the residual lignin content was 10% and the hemicellulose content of the final chips was 2.14%. The tear index for the pulp from Example 3 was SR 41, 13.2 Nm$^2$/kg resp. and the tensile strength was 65 kNm/kg.

Example 4

The aim of Example 4 was to investigate the effect of pre-hydrolysis on soda pulp quality.

The same reactor arrangement was used as in Example 1. Determination of hemicelluloses and pectins in wood and pulp fibers was done through acid methanolysis and gas chromatography, as described in Nord Pulp Pap Res J11(4): 216-219.

Example 4 was performed by using 1000 g o.d. spruce chips. During delignification the alkali (NaOH) charge was 50 g/L:

Example 4: pressure inside the reactor is reduced to a 0.2 bar absolute pressure, the reactor was filled with plain tap water, heating the reactor from 25° C. to 150° C. at a rate of 1.5° C./min, kept at 150° C. for 90 min, the pre-hydrolysis solution was displaced by tap water, 400 g of NaOH was pumped into the reactor (as a 10% w/w solution), extraction solution was circulated for 90 minutes, the lignin rich extract was discharged.

In Example 4, the residual lignin content was 6% and the hemicellulose content of the final chips was 1.9%. The tear index for the pulp from Example 4 was SR 40, 12.2 Nm$^2$/kg resp. and the tensile strength was 55 kNm/kg.

Example 5

The aim of Example 5 was to investigate the effect of pre-hydrolysis on soda pulp quality.

The same reactor arrangement was used as in Example 1. Determination of hemicelluloses and pectins in wood and pulp fibers was done through acid methanolysis and gas chromatography, as described in Nord Pulp Pap Res J11(4): 216-219.

Example 5 was performed by using 745 g o.d. bagasse. During delignification the alkali (NaOH) charge was 30 g/L.

Example 5: pressure inside the reactor was reduced to a 0.2 bar absolute pressure, the reactor was filled with plain tap water, heating the reactor from 25° C. to 150° C. at a rate of 1.5° C./min, kept at 150° C. for 90 min, the pre-hydrolysis solution was displaced by tap water, 220 g of NaOH was pumped into the reactor (as a 10% w/w solution), extraction solution was circulated for 90 minutes, the lignin rich extract was discharged.

The results of Example 5 clearly demonstrate that an oxygen starved environment enables a good hemicellulose extraction. For Example 5 the residual lignin content was 4% and the hemicellulose content of the final pulp was 1.1%. No tensile or tear-index was performed.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for removing lignin from lignocellulosic biomass, the method comprising:
   contacting lignocellulosic biomass with a first aqueous solution, which comprises at least 95 weight-% of water, within a reactor vessel, the lignocellulosic biomass and the first aqueous solution forming a reaction mixture,
   reducing a pressure in the reactor vessel below 0.8 bar absolute pressure, and then heating the reaction mixture to a predetermined extraction temperature of 70-250° C., and
   adding at least one extraction chemical, which comprises a base, to the reaction vessel when the extraction temperature is reached, and extracting lignin from the biomass to a liquid phase of the reaction mixture at a pH of 12 or greater.

2. The method according claim 1, further comprising adding the at least one extraction chemical as one single dose when the predetermined extraction temperature is reached.

3. The method according claim 1, wherein the base comprises a member selected from the group consisting of sodium hydroxide, potassium hydroxide, magnesium hydroxide, and sodium sulfide.

4. The method according to claim 1, further comprising using lignin rich extract from a previous extraction as the at least one extraction chemical.

5. The method according to claim 1, wherein the predetermined extraction temperature is in the range of 110-250° C.

6. The method according to claim 1, wherein a pressure inside the reactor vessel during the extraction of lignin is 5-8 bar absolute pressure.

7. The method according to claim 1, wherein the pH of the aqueous solution is 3-10.

8. The method according to claim 1, further comprising adding at least one chemical oxygen scavenger to the first aqueous solution.

9. The method according to claim 1, further comprising continuing the lignin extraction by circulating the liquid phase of the reaction mixture through the biomass as long as a desired reduced lignin content of the biomass is reached.

10. The method according to claim 1, wherein the extracting provides a treated biomass, and further comprising using the treated biomass,
    for production of paper, board, or the like;
    for production of dissolving pulp or nanocellulose;
    for production pellets or as raw material for fuel; and/or
    for production of particle board (chipboard).

11. The method according to according to claim 1, further comprising using the extracted lignin for production of energy or fuel and/or as raw material for chemical products.

12. The method according to claim 1, wherein the biomass is fed to the reaction vessel, the pressure in the reactor vessel is reduced to below 0.8 bar absolute pressure, and the first aqueous solution is fed to the reactor vessel while the pressure is kept reduced.

13. The method according to claim 1, wherein the pressure in the reactor vessel is reduced below 0.5 bar absolute pressure.

14. The method according to claim 1, wherein the pressure in the reactor vessel is reduced below 0.2 bar absolute pressure.

15. The method according to claim 1, wherein the pH during the extracting of lignin is greater than 13.

16. The method according to claim 1, wherein the predetermined extraction temperature is in the range of 135-160° C.

17. A method for removing lignin from lignocellulosic biomass, the method comprising:
    extracting an amount of carbohydrates from a lignocellulosic biomass to form a carbohydrate-reduced lignocellulosic biomass by contacting the lignocellulosic biomass with an aqueous solution comprising at least 75 weight % water, wherein the contacting is done at a pressure of 0.8 bar absolute pressure or below to define an oxygen poor environment having an oxygen concentration of 0.01 or less kg oxygen per kg of the aqueous solution, and wherein the oxygen poor environment reduces occurrence of condensation reactions of the lignin within the reaction mixture; and extracting an amount of lignin from the carbohydrate-reduced lignocellulosic biomass at a temperature of from 70-250° C. in the presence of at least one extraction compound.

18. The method of claim 17, wherein the at least one extraction compound comprises a basic compound, and wherein the extracting of an amount of lignin is done at a pH of 12 or greater.

19. The method of claim 17, wherein the extracting an amount of carbohydrates provides a first liquid fraction comprising a 85% or greater yield of carbohydrates from the biomass, and the extracting an amount of lignin from the carbohydrate-reduced lignocellulosic biomass provides a second liquid fraction comprising a 90% or greater yield of lignin from the biomass.

* * * * *